United States Patent Office 3,047,529
Patented July 31, 1962

3,047,529
PROCESS OF HEAT TREATING RUBBER AND CARBON BLACK WITH A TERTIARY AMINE N-OXIDE OR A PYRIDINE N-OXIDE AND RESULTING PROCESS
Richard Leshin, Akron, Ohio, assignor to The Goodyear Tire & Rubber Company, Akron, Ohio, a corporation of Ohio
No Drawing. Filed Feb. 10, 1959, Ser. No. 792,279
19 Claims. (Cl. 260—41.5)

This invention relates to the processing of rubber compositions and is particularly concerned with the use of particular chemical promoters in the preparation of low hysteresis processing mixtures of rubber and carbon black.

Various methods have been used to improve the physical properties of various rubbers containing high carbon black loadings. Heat treatments have been described which produce characteristic changes in the physical properties of vulcanizates such as higher electrical resistance, lower dynamic modulus and higher resilience. The method for achieving these desired properties is more fully described in U.S. Patent 2,118,601. Although the controlled mixing procedures described in the patent effect desirable results, the process has not been generally adopted because of the required extension of time in the ordinary mixing cycles. Various promoters or catalysts are shown in the prior art which allegedly speed up the process of treating the rubber and carbon black mixtures. For various reasons, the new promoters have not been extensively used commercially.

It is a primary object of this invention to provide new chemical promoters for the processing of rubber and carbon black mixtures at relatively high temperatures. It is a further object of this invention to provide new chemical promoters which bring about a substantial reduction in the customary time required for processing rubber and carbon black mixtures. Other objects will be obvious from the following description of the invention.

The practice of the present invention is concerned with a process which comprises mixing a sulfur vulcanizable rubber with a relatively large amount of a rubber reinforcing carbon black and a relatively small amount of at least one tertiary amine N-oxide, heating and masticating the mixture at a temperature of at least 250° F. for a short period of time, adding other desired compounding ingredients, shaping the vulcanizable rubber mass and thereafter curing the same.

The preferred chemical promoters of this invention are pyridine N-oxides which conform to the following structure

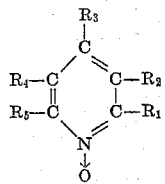

wherein $R_1$, $R_2$, $R_3$, $R_4$, and $R_5$ are selected from the group consisting of hydrogen, alkyl radicals having from 1 to 9 carbon atoms, cycloalkyl radicals having from 6 to 9 carbon atoms, aryl radicals, aralkyl radicals having from 7 to 16 carbon atoms, benzo radicals wherein two adjacent R's together with the pyridine ring form a fused dicyclic structure, nitro radicals, halo radicals, and carboxyl radicals.

Useful pyridine N-oxides are pyridine-N-oxide, 2-picoline-N-oxide, 3-picoline-N-oxide, 4-picoline-N-oxide, 2,6-lutidine-N-oxide, 2-methyl-5-ethyl-pyridine-N-oxide, 2-methyl-4-ethyl pyridine-N-oxide, 4-methyl-3-ethyl pyridine-N-oxide, 2,4,6-trimethyl-pyridine-N-oxide, 2-phenyl ethyl pyridine-N-oxide, quinoline-N-oxide, isoquinoline-N-oxide, 4-nitropyridine-N-oxide, 4-chloropyridine-N-oxide, 4-bromo-pyridine-N-oxide, 2-carboxy-pyridine-N-oxide, 3-carboxy-pyridine-N-oxide, 4-carboxy-pyridine-N-oxide, 2-carbethoxy-pyridine-N-oxide, 3-carbethoxy-pyridine-N-oxide, 4-carbethoxy-pyridine-N-oxide, 2,4,6-tricarboxy-pyridine-N-oxide, and 2,4,6-tricarbomethoxy-pyridine-N-oxide.

Non-fully equivalent tertiary amine N-oxides are those conforming to the following structure

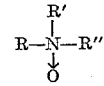

wherein R, R′, and R″ are selected from the group consisting of alkyl radicals having from 1 to 9 carbon atoms, cycloalkyl radicals having from 6 to 9 carbon atoms, aryl radicals and aralkyl radicals having from 7 to 16 carbon atoms.

Tertiary amine N-oxides which conform to this structure are trimethylamine-N-oxide, triethylamine-N-oxide, tripropylamine-N-oxide, dimethylaniline-N-oxide, diethylaniline-N-oxide, dimethyl benzylamine-N-oxide, dimethyl ethyl amine-N-oxide, N-ethyl-morpholine-N-oxide, N-phenylmorpholine-N-oxide, and N-methylpiperidine-N-oxide.

In the practice of this invention, various rubbers may be mixed with a relatively large amount of a rubber reinforcing carbon black and a relatively small amount, from 0.5 to 3.0 parts per 100 parts of rubber, of one or more of the tertiary amine N-oxides and thereafter heating the mixture of rubber and carbon black at a temperature of at least 250° F. to a temperature below that at which the rubber would be damaged, e.g., heating from 250° F. to 400° F. for a short period of time, e.g., from 10 to 60 minutes. The carbon black content of the rubber mixture will customarily range from about 25 to 100 parts by weight, based on the weight of the rubber although the carbon black content will customarily range from 35 to 75 parts. The heat treatment is carried out in the absence of vulcanizing materials such as sulfur or sulfur-bearing compounds.

Following the heat treatment wherein the rubber and carbon black are customarily mixed by a customary masticating process, other desired customary compounding ingredients, including conventional accelerators, antioxidants, plasticizers, fillers, curing agents, etc., are added to the mixture of rubber and carbon black. Thereafter, the compounded rubber is shaped and vulcanized in the usual manner.

Any carbon black, e.g., furnace black, channel black, etc., which is capable of reinforcing rubber may be used in the practice of the invention. The type of reinforcing black is often selected in view of the ultimate use for the compounded rubber.

The mastication of the mixtures of rubber and carbon black containing the teritary amine N-oxides of this invention is usually effected in the customary masticating equipment such as a two-roll mill or an internal mixer. The internal mixer, e.g., a Banbury mixer, is customarily used because such mixers exert a more severe masticating action upon the mixture which results in higher temperatures and shorter mixing times. Also, external heating means may be more advantageously used, if desired.

The prepared mixtures of rubber and carbon black will be compounded in the customary manner with conventional rubber compounding ingredients such as fillers, e.g., zinc oxide, etc.; curing agents, e.g., sulfur, organic peroxides, sulfur-releasing agents, etc.; accelerators, e.g., thiazoles, dithiocarbamates, sulfenamides, etc.; retarders, e.g., nitroso amines, etc.; antioxidants, e.g., alkylated phenols and amines, etc.; softeners such as various oils, waxes, etc. The compounded rubbers will normally be shaped and cured under customary curing conditions by heating and pressing in a conventional mold which will, of course, vary with the rubber article being prepared. Customary compounding and curing of rubber articles is more fully set forth in Vanderbilt Rubber Handbook, 10th Edition, published by the R. T. Vanderbilt Company, Inc., New York, New York.

The various rubbers which can be used in the practice of this invention are natural rubber, synthetic rubbery homopolymers of aliphatic conjugated diolefins, particularly isoprene and butadiene, and synthetic rubbery copolymers of these diolefin hydrocarbons with copolymerizable monoolefinic compounds, such as isobutylene, styrene, alpha methyl styrene, methyl acrylate, ethyl acrylate, methyl methacrylate, acrylonitrile, alpha beta unsaturated ketones and mono vinyl pyridines.

The invention is particularly useful in treating natural rubber, polyisoprenes including the cis 1,4-polyisoprene which may include a minor proportion of the trans polyisoprene, butyl rubber which is a polymerization product of a major proportion of a mono olefin such as isobutylene and a minor proportion of a multi olefin such as butadiene or isoprene, SBR rubber which is a rubbery copolymer of butadiene and styrene which may contain from 50 to 75 percent by weight of butadiene, and nitrile rubber which is a rubbery copolymer of a major proportion of butadiene and a minor proportion of acrylonitrile.

The invention may be further illustrated by means of the following examples which are not intended as limitations on the scope of the invention.

EXAMPLE 1

A master batch containing 100 parts of crude rubber, 25 parts of carbon black and 1 part of 4-nitro-pyridine-N-oxide as a reaction promoter may be prepared by mixing these ingredients together in a Banbury mixer. After the ingredients are added to the mixer, the rotor speed is increased to permit gradual heat build-up in the mixing chamber. This increased speed will be maintained until the desired temperature of about 375° F. is attained after which the rotor speed is adjusted to maintain the temperature at about 375° F. This speed and temperature are maintained for a period of about 10 minutes after which the master batch is allowed to cool for about 24 hours. The cooled master batch will then be compounded in a conventional manner, shaped and cured according to customary practice to provide various useful rubber products.

EXAMPLE 2

Another master batch may be prepared as in Example 1 except that the carbon black content is increased to 45 parts by weight, based on 100 parts by weight of rubber.

EXAMPLE 3

Another master batch may be prepared as in Example 1 except that the carbon black content is increased to 80 parts by weight, based on 100 parts by weight of rubber.

EXAMPLE 4

Another master batch may be prepared as in Example 1 except that the carbon black content will be increased to 100 parts by weight.

EXAMPLE 5

Master batches may be prepared as in Examples 1 through 4 except that the 4-nitro-pyridine-N-oxide is replaced with 4-picoline-N-oxide.

EXAMPLE 6

Master batches may be prepared as in Examples 1 through 4 except that the 4-nitro-pyridine-N-oxide is replaced with pyridine-N-oxide.

EXAMPLE 7

Master batches may be prepared as in Examples 1 through 6 except that the rubber is SBR rubber containing about 71% by weight of butadiene and about 29% by weight of styrene.

EXAMPLE 8

Master batches may be prepared as in Examples 1 through 6 wherein the rubber is butyl rubber comprised of a major proportion of isobutylene, i.e., 90 to 99.5 parts of isobutylene and a minor proportion, i.e., .5 to 10% of isoprene.

The efficacy of the invention is further illustrated by the following tables wherein masterbatches C through H (Table I) containing about 100 parts by weight of natural rubber, about 45 parts by weight of furnace black and about .1 part by weight of the indicated promoter were prepared in the manner described in Example 2. Masterbatch B contained no promoter but was otherwise treated the same as the other masterbatches. Masterbatch A was not given any heat treatment. These masterbatches were compounded in a conventional manner by adding thereto about 2.5 parts of stearic acid, about 2.0 parts of phenyl-beta-naphthylamine, about 3.0 parts of zinc oxide, about 3.0 parts of sulfur and about 0.5 part of N-oxydiethylene-2-benzothiazolesulfenamide on a conventional rubber mill. Samples were prepared and cured in a conventional manner as indicated in Table II.

In these tests the stocks were milled on a conventional two-roll rubber mill until the indicated compounding ingredients were thoroughly mixed with the rubber masterbatch and a homogeneous composition was obtained. Thereafter, rubber samples were cured in the conventional manner according to the indicated curing conditions.

The ultimate tensile strength, elongation, and modulus were obtained according to the standard test procedure wherein dumbbell samples were died from cured sheets and tested in a conventional tensile tester. This standard test procedure is more fully described in "New Autographic Machine for Testing Tensile Properties of Rubber," by George J. Albertoni, Industrial and Engineering Chemistry, Analytical Edition, vol. 3, page 236, 1931.

The hot and cold rebound tests were performed essentially in the manner described in American Society for Testing Materials test procedure D-1054-55. The dynamic properties (dynamic modulus, internal friction, and resilience) were determined according to the procedure described by Gehman, Woodford, and Stambaugh in Industrial and Engineering Chemistry, vol. 33, pages 1032-1038, August 1941.

The electrical resistance was determined by preparing samples that were 0.115 inch thick and which were cured between .005 gauge brass plates. The resistance across an area of 1.0 square inch was measured on a Westinghouse ohmmeter using two 1½-volt dry cells as the source of electricity. The logarithm of the resistance in ohms is reported in Table II as the Log of Electrical Resistance.

*Table I*

| Promoter: | Stock |
|---|---|
| None (no heat treatment) | A |
| None—heat treated as in Example 2 | B |
| Pyridine-N-oxide—heat treated as in Example 2 | C |
| 2-methylpyridine-N-oxide—heat treated as in Example 2 | D |
| 3-methylpyridine-N-oxide—heat treated as in Example 2 | E |
| 4-methylpyridine-N-oxide—heat treated as in Example 2 | F |
| 2,6-dimethylpyridine-N-oxide—heat treated as in Example 2 | G |
| 4-nitropyridine-N-oxide—heat treated as in Example 2 | H |

Table II

| Cures in minutes at 275° F. | A | B | C | D | E | F | G | H |
|---|---|---|---|---|---|---|---|---|
| Tensile, p.s.i.: | | | | | | | | |
| 35 | 4,025 | 2,950 | 3,600 | 3,700 | 3,850 | 3,650 | 3,800 | 3,525 |
| 70 | 4,150 | 3,500 | 3,500 | 3,325 | 3,400 | 3,500 | 3,600 | 3,325 |
| 140 | 3,525 | 3,100 | 2,825 | 2,750 | 2,875 | 2,500 | 2,500 | 2,900 |
| 210 | 3,375 | 2,575 | 2,600 | 2,600 | 2,625 | 2,400 | 2,575 | 2,550 |
| Elongation, Percent: | | | | | | | | |
| 35 | 580 | 460 | 450 | 460 | 450 | 420 | 470 | 400 |
| 70 | 540 | 470 | 400 | 400 | 400 | 400 | 430 | 380 |
| 140 | 500 | 440 | 380 | 370 | 380 | 350 | 370 | 370 |
| 210 | 520 | 410 | 370 | 370 | 350 | 350 | 380 | 360 |
| Modulus at 300% Elongation, p.s.i.: | | | | | | | | |
| 35 | 1,700 | 1,550 | 2,100 | 2,075 | 2,200 | 2,225 | 2,000 | 2,300 |
| 70 | 1,800 | 1,775 | 2,350 | 2,225 | 2,350 | 2,300 | 2,100 | 2,375 |
| 140 | 1,650 | 1,750 | 1,975 | 1,975 | 1,975 | 1,975 | 1,800 | 2,100 |
| 210 | 1,425 | 1,550 | 1,900 | 1,850 | 2,000 | 1,975 | 1,800 | 1,900 |
| Log of Electrical Resistance: | | | | | | | | |
| 70 | 2.73 | 6.98 | 7.60 | 7.19 | 7.85 | 8.01 | 7.25 | 8.38 |
| Cold Rebound (Percent): | | | | | | | | |
| 85 | 71.8 | 73.0 | 74.6 | 74.6 | 75.2 | 75.2 | 74.6 | 78.2 |
| 155 | 69.6 | 72.4 | 71.2 | 71.2 | 71.2 | 73.0 | 70.7 | 74.1 |
| 225 | 68.5 | 66.7 | 67.9 | 67.3 | 67.9 | 69.0 | 68.5 | 71.8 |
| Hot Rebound (Percent): | | | | | | | | |
| 85 | 80.6 | 82.5 | 84.2 | 84.2 | 83.6 | 84.2 | 83.0 | 85.4 |
| 155 | 78.8 | 81.8 | 81.8 | 80.6 | 80.6 | 81.8 | 78.8 | 81.8 |
| 225 | 75.8 | 74.1 | 77.0 | 75.8 | 77.6 | 78.2 | 75.2 | 79.4 |
| Dynamic Modulus (kg/cm.$^2$): | | | | | | | | |
| 70 | 66.6 | 58.0 | 67.1 | 70.4 | 69.4 | 65.2 | 62.4 | 62.6 |
| 140 | 62.1 | 62.4 | 70.4 | 66.1 | 58.8 | 58.0 | 58.6 | 54.5 |
| Internal Friction ($\times 10^{-3}$): | | | | | | | | |
| 70 | 14.3 | 12.2 | 10.2 | 12.2 | 11.2 | 10.2 | 10.9 | 9.0 |
| 140 | 15.3 | 15.3 | 13.6 | 13.9 | 12.2 | 11.9 | 13.4 | 10.9 |
| Resilience (Percent): | | | | | | | | |
| 70 | 59.1 | 60.0 | 68.7 | 67.0 | 67.4 | 67.9 | 65.0 | 69.9 |
| 140 | 54.9 | 54.2 | 63.7 | 60.0 | 60.6 | 61.0 | 57.2 | 61.0 |

These tests show that there is a lowering of the heat generation properties of rubber samples when the promoters of this invention are added to standard rubber stocks.

While certain representative embodiments and details have been shown for the purpose of illustrating the invention, it will be apparent to those skilled in this art that various changes and modifications may be made therein without departing from the spirit or scope of the invention.

I claim:

1. The process which comprises mixing rubber with a relatively large amount of a rubber reinforcing carbon black and a relatively small amount of at least one tertiary amine N-oxide conforming to the following structure

wherein R, R', and R'' are selected from the group consisting of alkyl radicals having from 1 to 9 carbon atoms, cycloalkyl radicals having from 6 to 9 carbon atoms, aryl radicals and aralkyl radicals having from 7 to 16 carbon atoms, heating and masticating the mixture at a temperature of at least 250° F. for a short period of time, adding other desired compounding ingredients, shaping the vulcanizable rubber mass and thereafter curing the same.

2. The process which comprises mixing rubber with a relatively large amount of a rubber reinforcing carbon black and a relatively small amount of at least one compound conforming to the following structure

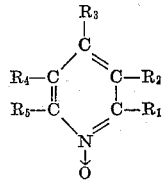

wherein $R_1$, $R_2$, $R_3$, $R_4$, and $R_5$ are selected from the group consisting of hydrogen, alkyl radicals having from 1 to 9 carbon atoms, cycloalkyl radicals having from 6 to 9 carbon atoms, aryl radicals, aralkyl radicals having from 7 to 16 carbons atoms, benzo radicals wherein two adjacent R's together with the pyridine ring form a fused dicyclic structure, nitro radicals, halo radicals, and carboxylic radicals, heating and masticating the mixture at a temperature of at least 250° F. for a short period of time, adding other desired compounding ingredients, shaping the vulcanizable rubber mass and thereafter curing the same.

3. The process of claim 2 wherein the carbon black is present in a proportion of from 25 to 100 percent by weight, based on the weight of the rubber.

4. The process according to claim 2 wherein the mastication takes place at a temperature between 250° F. and 400° F.

5. A process according to claim 2 wherein the composition is masticated for a period ranging from 10 minutes to 60 minutes.

6. The process according to claim 2 wherein the N-oxide is present in a proportion ranging from 0.5 to 3% by weight, based on the weight of the rubber.

7. A process which comprises mixing rubber with from 25 to 100 percent by weight, based on the weight of the rubber, of a rubber reinforcing carbon black and from 0.5 to 3.0 percent by weight, based on the weight of the rubber, of at least one compound conforming to the following structure

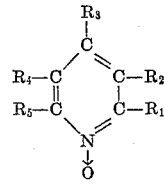

wherein $R_1$, $R_2$, $R_3$, $R_4$, and $R_5$ are selected from the group consisting of hydrogen, alkyl radicals having from 1 to 9 carbon atoms, cycloalkyl radicals having from 6 to 9 carbon atoms, aryl radicals, aralkyl radicals having from 7 to 16 carbon atoms, benzo radicals wherein two adjacent arms together with the pyridine ring form a fused dicyclic structure, nitro radicals, halo radicals, and carboxylic radicals, heating at a temperature ranging from 250° F. to 400° F. while masticating the mixture for a period ranging from 10 to 60 minutes, adding other desired compounding ingredients, shaping the vulcanizable rubber mass, and thereafter curing the same.

8. The process according to claim 7 wherein the N-oxide is pyridine N-oxide.

9. The process according to claim 7 wherein the N-oxide is 2-methyl pyridine-N-oxide.

10. The process according to claim 7 wherein the N-oxide is 3-methyl pyridine-N-oxide.

11. The process according to claim 7 wherein the N-oxide is 4-methyl pyridine-N-oxide.

12. The process according to claim 7 wherein the N-oxide is 2,6-dimethyl pyridine-N-oxide.

13. The process according to claim 7 wherein the N-oxide is 4-nitro pyridine-N-oxide.

14. A vulcanized rubber product made in accordance with the process defined in claim 1.

15. A vulcanized rubber product made in accordance with the process of claim 2.

16. A vulcanized rubber product made in accordance with the process of claim 7.

17. An unvulcanized rubber product made in accordance with the process of claim 19.

18. In the process which comprises forming a mixture of rubber and a relatively large amount of a rubber reinforcing carbon black and subjecting the mixture to heat treatment at a temperature of from 250° F. to 400° F., the improvement which comprises carrying out said heat treatment in the presence of at least one tertiary amine N-oxide conforming to the following structure

wherein R, R', and R" are selected from the group consisting of alkyl radicals having from 1 to 9 carbon atoms, cycloalkyl radicals having from 6 to 9 carbon atoms, aryl radicals and aralkyl radicals having from 7 to 16 carbon atoms.

19. The process which comprises mixing rubber with a relatively large amount of a rubber reinforcing carbon black and a relatively small amount of at least one compound selected from the group consisting of (a) tertiary amine N-oxides conforming to the following structure

wherein R, R', and R" are selected from the group consisting of alkyl radicals having from 1 to 9 carbon atoms, cycloalkyl radicals having from 6 to 9 carbon atoms, aryl radicals and aralkyl radicals having from 7 to 16 carbon atoms, and (b) a pyridine N-oxide conforming to the following structure

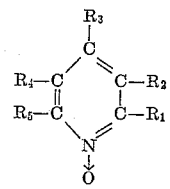

wherein $R_1$, $R_2$, $R_3$, $R_4$, and $R_5$ are selected from the group consisting of hydrogen, alkyl radicals having from 1 to 9 carbon atoms, cycloalkyl radicals having from 6 to 9 carbon atoms, aryl radicals, aralkyl radicals having from 7 to 16 carbon atoms, benzo radicals wherein two adjacent R's together with the pyridine ring form a fused dicyclic structure, nitro radicals, halo radicals and carboxyl radicals; heating and masticating the mixture at a temperature of at least 250° F. for a short period of time; adding other desired compounding ingredients, shaping the vulcanizable rubber mass and thereafter curing the same.

References Cited in the file of this patent
UNITED STATES PATENTS

| | | |
|---|---|---|
| 2,315,849 | Gerke | Apr. 6, 1943 |
| 2,315,850 | Gerke | Apr. 6, 1943 |
| 2,315,855 | Howland | Apr. 6, 1943 |
| 2,315,856 | Howland | Apr. 6, 1943 |
| 2,315,857 | Howland | Apr. 6, 1943 |
| 2,734,886 | Doak | Feb. 14, 1956 |
| 2,755,258 | Hay et al. | July 17, 1956 |
| 2,790,839 | Doak | Apr. 30, 1957 |
| 2,891,924 | Doak | June 23, 1959 |
| 2,891,925 | Doak | June 23, 1959 |